United States Patent [19]

Hansel et al.

[11] 4,276,590
[45] Jun. 30, 1981

[54] CURRENT SHARING MODULAR POWER SYSTEM

[75] Inventors: Allen B. Hansel, Wayside; Thiagarajan Natarajan, Orange, both of N.J.

[73] Assignee: The Perkin-Elmer Corporation, Norwalk, Conn.

[21] Appl. No.: 35,370

[22] Filed: Apr. 30, 1979

[51] Int. Cl.³ .............................................. H02M 7/23
[52] U.S. Cl. ........................................ 363/71; 307/82
[58] Field of Search ..................... 307/52, 53, 58, 82, 307/87; 323/17, 20, 25, DIG. 1; 363/69-72, 79, 80, 98, 132

[56] References Cited

U.S. PATENT DOCUMENTS

| | | | |
|---|---|---|---|
| 3,217,171 | 11/1965 | Corey | 307/87 X |
| 3,303,349 | 2/1967 | Sinclair et al. | 307/82 X |
| 3,621,365 | 11/1971 | Beck et al. | 307/82 X |
| 3,675,037 | 7/1972 | Hamilton | 363/71 X |
| 4,074,182 | 2/1978 | Weischedel | 323/25 |
| 4,150,425 | 4/1979 | Nagano et al. | 363/71 X |
| 4,222,098 | 9/1980 | Nagano | 363/71 |

FOREIGN PATENT DOCUMENTS 2055754  5/1971  Fed. Rep. of Germany ............. 363/71

*Primary Examiner*—A. D. Pellinen
*Attorney, Agent, or Firm*—Salvatore A. Giarratana; Francis L. Masselle; John D. Crane

[57] ABSTRACT

A current sharing modular power system including, in each module, an inverter circuit and means to determine the current to a common load from the module. A difference circuit is provided to determine the difference between the module supplied current and the average of the current supplied by the other modules. The difference is then utilized to vary the pulse width of the inverter output so that the pulses are wider if the current from the module is smaller than the current supplied by the other modules and the pulses are thinner if the current from the module is larger than the average current supplied by the other modules. The system also includes a voltage sense circuit to adjust the module operation to maintain a constant voltage output.

10 Claims, 6 Drawing Figures

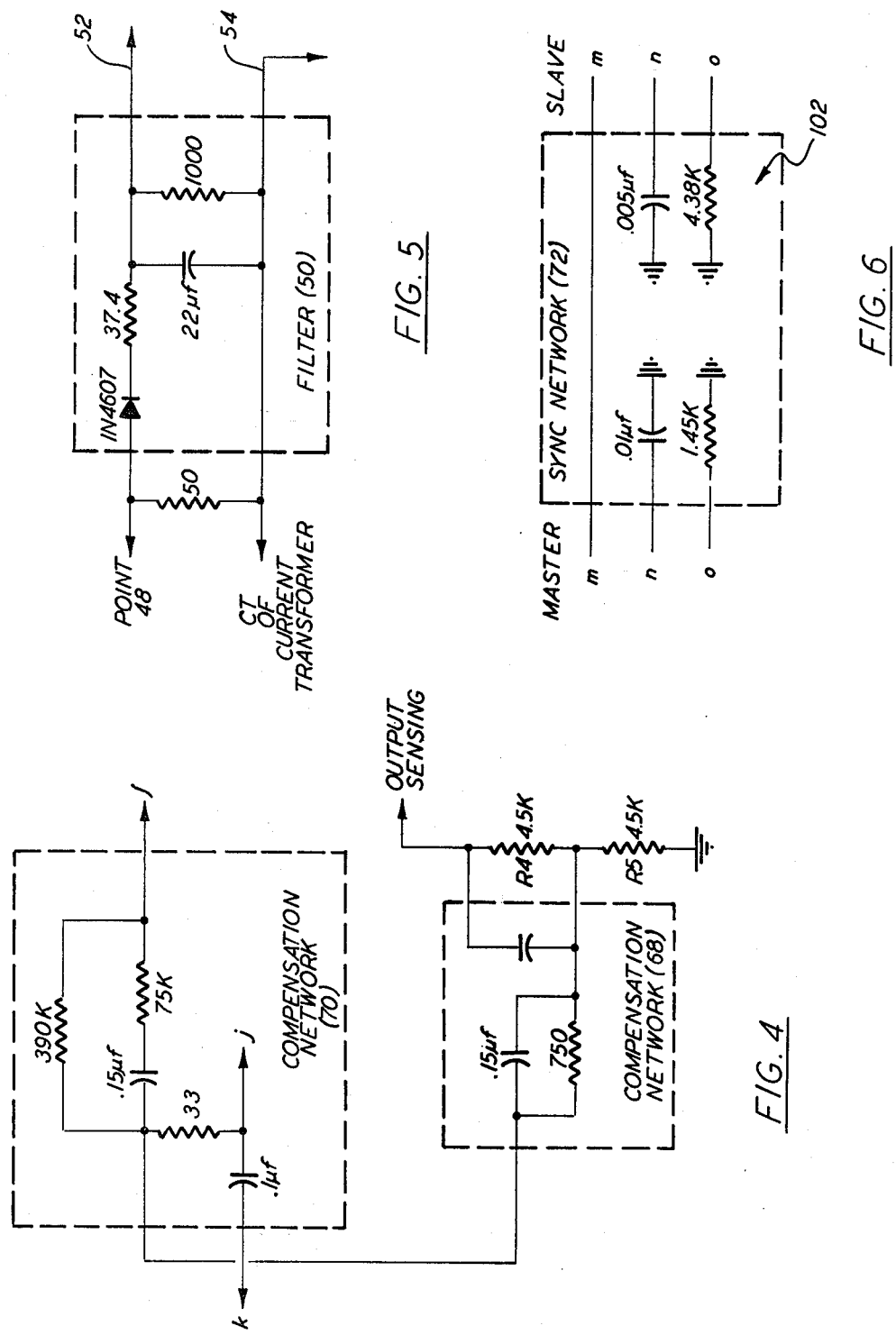

CURRENT SHARING MODULAR POWER SYSTEM

The present invention relates generally to an electrical power system and particularly to a power system which includes circuitry to permit current sharing between a plurality of power modules which are coupled together to allow each module to supply the same current to a power distribution bus.

In the field of digital electronics and particularly the field of digital computers, the electronic circuits in the TTL and MOS families are often utilized to perform numerous digital functions. The circuit modules in these logic families are typically mounted on a circuit card which is capable of supporting large numbers of such circuit modules disposed in both rows and columns. In many instances, all available module positions on each card are occupied and, accordingly, all digital signals input and output from the card must be supplied to via a connector.

The integrated circuits on each circuit card require a highly regulated DC power supply to function properly. One approach to providing the regulated power necessary is to provide a power source and regulator on each card. This approach is not entirely satisfactory as the power circuitry takes up space which might otherwise be useable for digital logic modules. This approach is also undesirable in systems having multiple circuit cards because the power system circuits must be duplicated on each circuit card which unnecessarily adds to system cost. A further disadvantage to mounting the power system on each card is that heat dissipation becomes a problem which, if not solved, may give rise to circuit failures. Consequently, a central power source seems to offer a better solution to providing power to a plurality of circuit modules on one or more circuit cards.

In digital systems such as a mini-computer in which the user is likely to purchase one system and subsequently add additional processing modules or sub-systems, use of even a centralized power system does present some problems. In configurations permitting subsequent add-on digital modules, the DC power requirements of the subsequently modified system are greater than those for the initially delivered system. It is, therefore, desirable to have a power system capable of providing the power requirements of the initially delivered system as well as for the system following subsequent modification. In accomplishing this objective, the power supply can be designed initially to handle the load required by the initial system as well as that which might be experienced following subsequent modification. While this approach does permit providing sufficient electrical power for the system, it does contribute to higher system cost as an oversized power supply must be initially provided with a system.

An approach to solving the problem of higher power supply cost in an initial system wherein subsequent modification appears likely is to provide a power supply initially capable of handling the current load and subsequently add power supplies in parallel with the initial supply to handle the increased load due to subsequent system modification. The difficulty with this approach, however, is that typical power supplies, when coupled in parallel, do not necessarily share the current load. Indeed, in most instances, one of the power supplies will attempt to provide all of the power requirements while the other power supply does little if anything. When this occurs, the supply attempting to provide all the current may experience an overload condition which, if the supply is equipped with overload protection circuitry, will shut down thereby leaving the second supply to attempt to provide the system power requirement. If the second supply also has an overload protection circuit, it too will shut down leaving the system without power.

In view of the foregoing difficulties, it is the principle objective of the present invention to provide a modular power system wherein two or more modules can be coupled in parallel and the current load is shared substantially equally between the parallel coupled power modules.

It is still a further objective of the present invention to provide a modular power system which is suitable for field installation by service personnel wherein such installation does not require critical adjustment or modification of pre-existing circuitry.

BRIEF DESCRIPTION OF THE INVENTION

In achieving the foregoing and other objectives of the present invention, a modular power system has been developed which utilizes a power inverter circuit for converting DC current to a high frequency alternating current. The output of the inverter is coupled by way of a transformer to a rectifier and a filter network which produces at its output a substantially ripple-free DC voltage which, for the embodiment exemplified in the drawings, is 5 volts at a current level ranging from 0 to 150 amperes per module. In a system where at least 2 modules are coupled in parallel, a voltage sense circuit is coupled between each module and the common power distribution bus which connects to the filter output of each module. In addition, a current sensing circuit is provided to sense the current at the output of each power inverter. A difference signal is developed having a magnitude related to the difference between the current at the output of one particular power inverter and the current at the output of a second power inverter in another module providing power to the common power distribution bus. This difference signal and the voltage sense signal are combined together to develop a pulse width control signal which in turn controls the pulse width of the signal developed at the output of each power inverter. Each power inverter is operative in response to the pulse width control signal so that it will increase its current output when the pulse width control signal indicates that the load is not being shared evenly and the other power module is supplying more current and decreases the pulse width when the pulse width control signal indicates that the module is supplying more current to the load than the other power module.

A further feature of the present invention is that each of the power inverter circuits in different power modules is synchronized by a synchronizing circuit so that the inverter output signals are at exactly the same frequency. This is advantageous because the ripple occurring at the rectified and filtered output is thereby reduced to its minimum level because there is no beat frequency between the power inverter outputs.

BRIEF DESCRIPTION OF THE DRAWINGS

The foregoing and other objectives, advantages and features of the present invention are described below in greater detail in connection with the drawings which illustrate the invention wherein:

FIG. 4 shows two compensation networks used in the system of FIG. 1;

FIG. 5 shows the components which may be used to construct the filter of FIG. 1; and FIG. 6 shows a synchronizing circuit which may be used in the system of FIG. 1.

DETAILED DESCRIPTION

Figure 1:
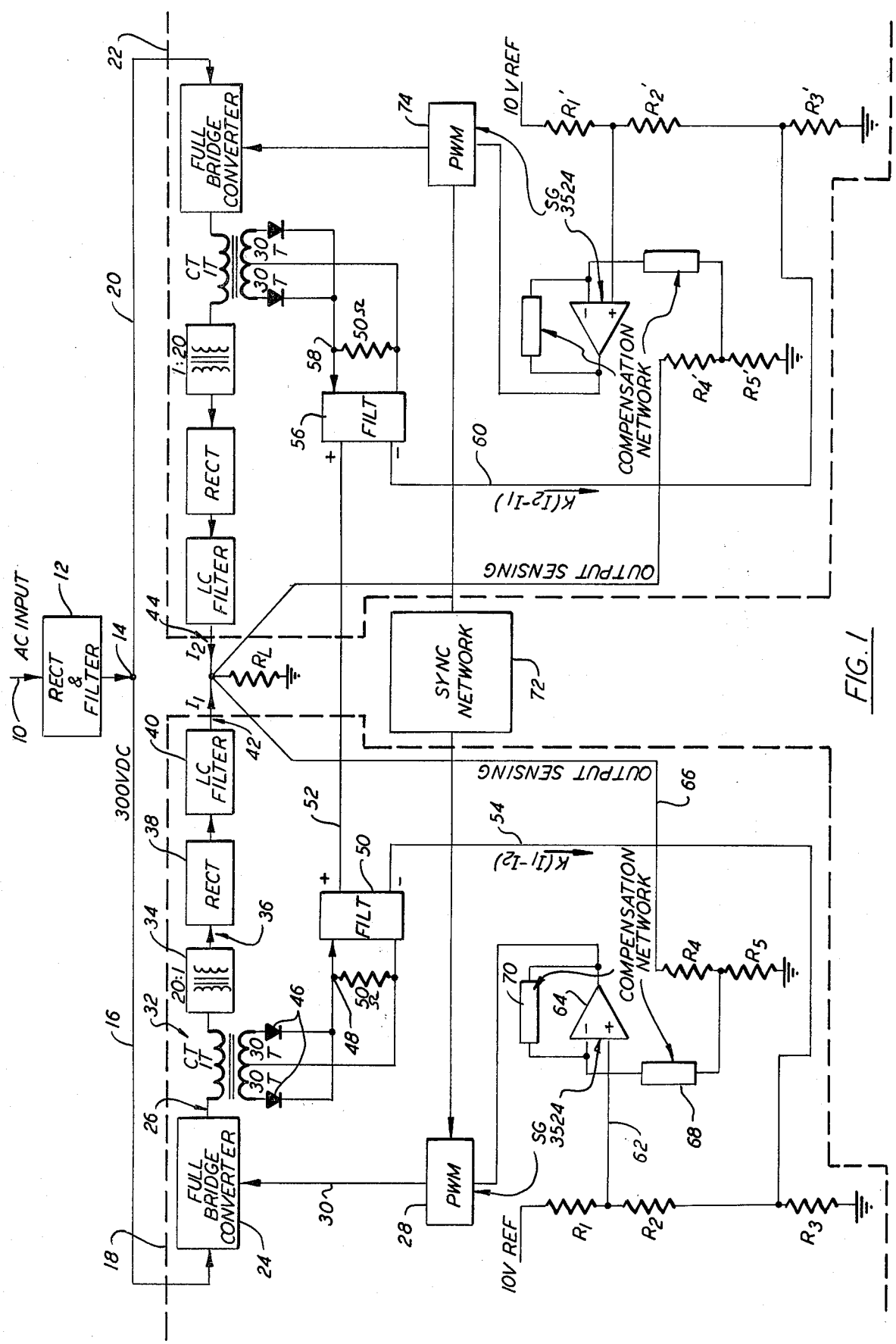
FIG. 1 is a block diagram of a power system according to the present invention having two power sharing modules coupled to a common load.

A block diagram of the current sharing modular power system of the present invention is illustrated by FIG. 1. An alternating current input is provided at line 10 which is applied to the input of a conventional rectifier and filter network 12 which produces at its output 14 a direct current voltage which, in an illustrative embodiment of the present invention, is typically in the order of 300 volts DC. The rectifier and filter network 12 is operative in a conventional manner to convert the AC input to a substantially ripple free DC output.

The direct current voltage at the output 14 from the rectifier and filter network 12 is coupled by a line 16 to a first power module which is surrounded by the dotted line 18. Likewise, the DC electric power from the output 14 is coupled by a further line 20 to the input of a second power module which is surrounded by a dotted line 22. It should be noted at the present time that the circuitry of the first power module 18 and the second power module 22 are substantially identical to each other and that the following description of the circuitry will concentrate primarily on the circuitry of one power module, namely the first power module 18.

The direct current voltage appearing on wire 16 enters the first power module 18 and is applied to a power inverter circuit 24 which converts the DC input thereto to an alternating current output appearing at line 26. For a full bridge inverter circuit which is typical of the power inverter 24, the output at line 26 comprises an alternating current signal having a frequency of 20 KHz and a peak to peak amplitude of approximately 600 volts. Both the positive and the negative going pulses appearing at line 26 are pulse width modulated by the inverter 24 under control of pulse width modulation signals which are generated by the pulse width modulator circuit 28 and coupled thereto over the line 30.

The output of the inverter circuit 24 appearing at line 26 is coupled through a current sensing transformer 32 to a step-down power transformer 34 which drops the voltage appearing at the output of the inverter 24 to a voltage approximating the desired voltage to be applied to the power load $R_L$ which, for the system illustrated, is around 5 volts. The lower voltage alternating current signal appearing at line 36 is applied to a conventional rectifier circuit 38 to convert the alternating current into a direct current which is thereafter filtered by a conventional LC filter 40 to produce a substantially ripple free DC output voltage at point 42. This voltage is then coupled by an appropriate power distribution network to the power load which is designated $R_L$. This load, in a typical integrated circuit system, is a distributed one which is typically spread over a plurality of circuit boards with a power bus interconnecting all the circuit boards.

In a similar manner, the DC voltages appearing on line 20 is converted by the second power module 22 to a DC voltage appearing at line 44 which is coupled directly to the power load $R_L$ as well. The modules according to the invention operate so that the voltage output of the first power module 18 and the second power module 22 are identical, and the current in the load $R_L$ is shared substantially equally between the power module 18 and the power module 22. The remainder of the circuitry to be discussed hereinafter is primarily operative to assure that the operation of the power module 18 and the power module 22 is adjusted so that the current in the load $R_L$ is shared evenly between the first power module 18 and the second power module 22.

As indicated earlier, a current sensing transformer 32 is provided between the power inverter 24 and the transformer 34. The current sensing transformer 32 produces a signal in its secondary winding which is proportional to the current passing through its primary winding between the output 26 of inverter 24 and the transformer 34. The secondary voltage of transformer 32 is rectified by diodes 46 to produce a DC signal at point 48 whose amplitude is porportional to the current flowing through the primary winding of current sensing transformer 32. A filter network 50 is coupled to the secondary winding of the current sensing transformer 32 and also by a wire 52 to a corresponding filter network 56 in the second power module 22. The filter 50 responds to the voltage signal appearing at point 48 to produce a DC voltage which is porportional to the current $I_1$ from the first module 18 to the load $R_L$. In a similar manner, the filter 56 responds to the voltage signal at point 58 to produce a DC voltage which is proportional to the current $I_2$ from the second module 22 to the load $R_L$.

The filters 50 and 56 act as two batteries bucking each other which produce a difference current in the network defined by the filters 50 and 56, the wires 52, 54 and 60 and the resistors $R_3$ and $R_3'$ which is proportional to the difference between $I_1$ and $I_2$.

The difference current on line 54 passes through resistor $R_3$ and produces a voltage (difference signal) across $R_3$. The difference signal is then coupled through $R_2$ and by line 62 to the positive input of a comparator circuit 64 which, in the illustrative embodiment of the present invention, comprises a portion of the pulse width modulator module 28 and is particularly part of the integrated circuit by Silicon General known as SG3524.

An output voltage sensing line 66 is coupled to the power distribution network preferably at a position midway in the distributed load $R_L$ so that circuits at the far end of the distributed load will experience a voltage below that at the sense point but within the desired voltage tolerance and those circuits closer to the output of the LC filters are above that voltage sensed by the line 66 but also within the voltage tolerance. The sensed voltage is then applied through a resistor network including resistors $R_4$ and $R_5$ as well as through a compensation network 68 to the negative input of the amplifier circuit 64. A further compensation network 70 couples between the output of the amplifier circuit 64 and its negative or inverting input.

The amplifier circuit 64 and the pulse width modulator 28 respond to the voltage sensed signal on line 66 as well as to the current difference signal on the line 54 so as to adjust the voltage and current appearing at the output point 42. In particular, whenever the sensed voltage on the line 66 falls below the desired output voltage for the power supply, the amplifier circuit 64 causes the pulse width modulator 28 to widen the pulses being produced by the inverter circuit 24. When this occurs, the output voltage from the first power module 18 is increased. When the sensed output voltage appearing on line 66 is above the desired level, the amplifier 64 responds to the increased voltage to cause the pulse width modulator 28 to reduce the pulse width of pulses produced by the inverter circuit 24. In a similar manner, the amplifier 64 responds to the current difference signal on line 54 so as to either increase or decrease the pulse width of the signal produced at the output of the inverter 24. The pulse width is increased whenever the difference signal indicates that the current $I_2$ is greater than the current $I_1$. On the otherhand, the pulse width of the pulses produced by the inverter 24 is decreased whenever the difference signal on line 54 indicates that the current $I_1$ is greater than the current $I_2$. It should be noted, however, that the voltage sensing feedback which adjusts the inverter 24 operation is independent of the current sensing feedback which also adjusts the inverter 24 operation. Accordingly, either the sense line 66 or the line 54 may be coupled to a reference voltage and the other feedback network to the amplifier 64 will continue to operate in the manner described above.

The operation of power module 22 is substantially the same as described above for power module 18. The circuitry of FIG. 1 also includes a synchronizing network 72 which couples to the pulse width modulator circuit 28 in power module 18 to the pulse width modulator circuit 74 in the second power module 22. The synchronizing network 72 is operative to insure that the frequency of the pulses produced by the pulse width modulator circuit 28 and 74 are identical to each other. In this manner, the DC voltage appearing at the output point 42 from the first power module 18 and 44 from the second power module 22 have a ripple at exactly the same frequency and therefore, there is no beat frequency between them which would tend to increase the ripple voltage on the load $R_L$.

Figure 2:
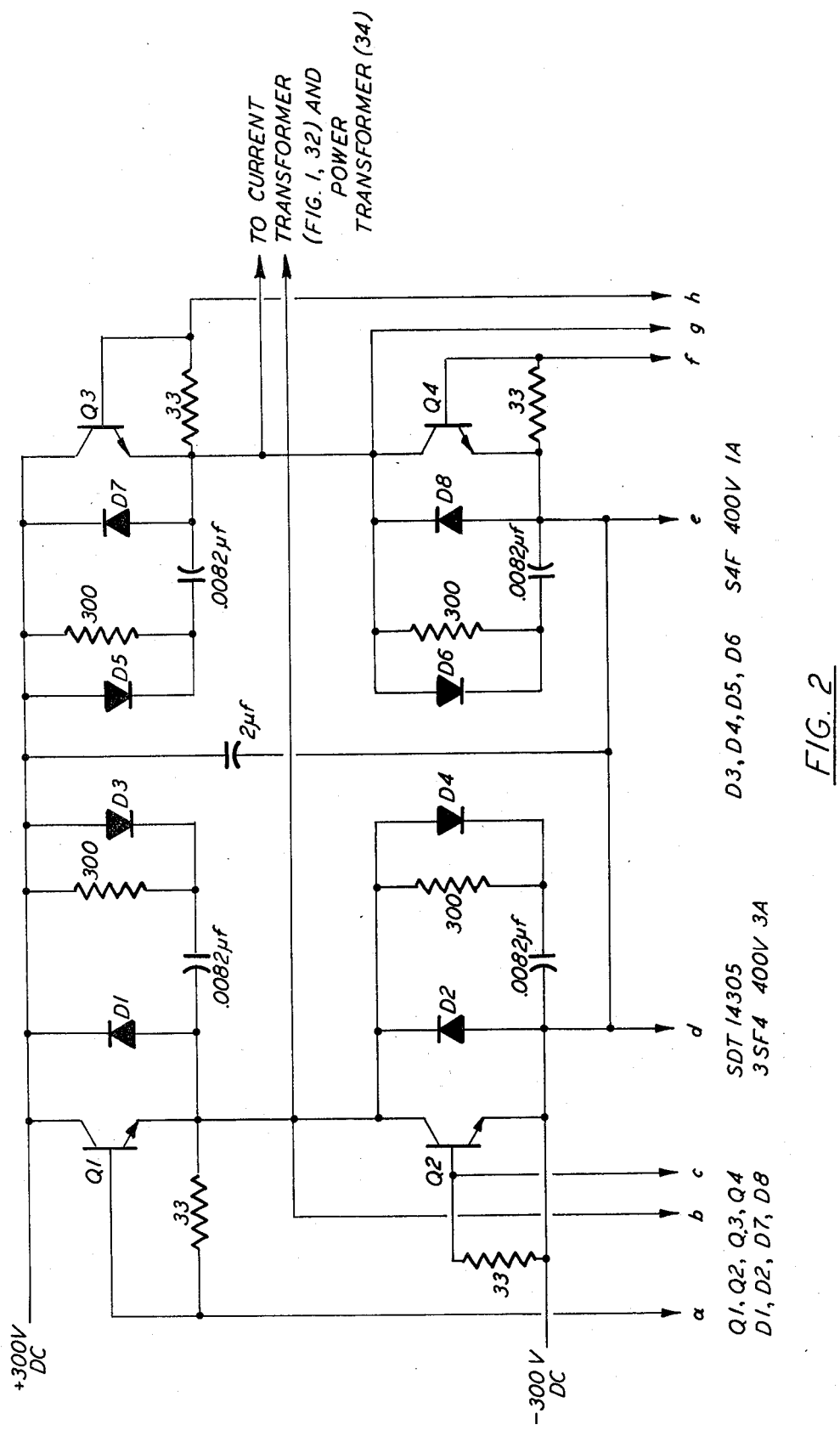
FIG. 2 is a circuit diagram of a typical full bridge inverter circuit which may be used as part of each power module designed according to the present invention.

The circuit for a typical full bridge inverter 24 is illustrated in FIG. 2. The circuitry of FIG. 2 is controlled by control signals which are applied thereto over the lines labeled a,b,c,d,e,f,g and h. These control signals are operative to cause transistors Q1 and Q4 to conduct during half of the cycle of the inverter and transistors Q2 and Q3 to be conductive during the other half of the cycle. In this manner, an alternating current is established through the current transformer 32 and the power transformer 34.

Figure 3:
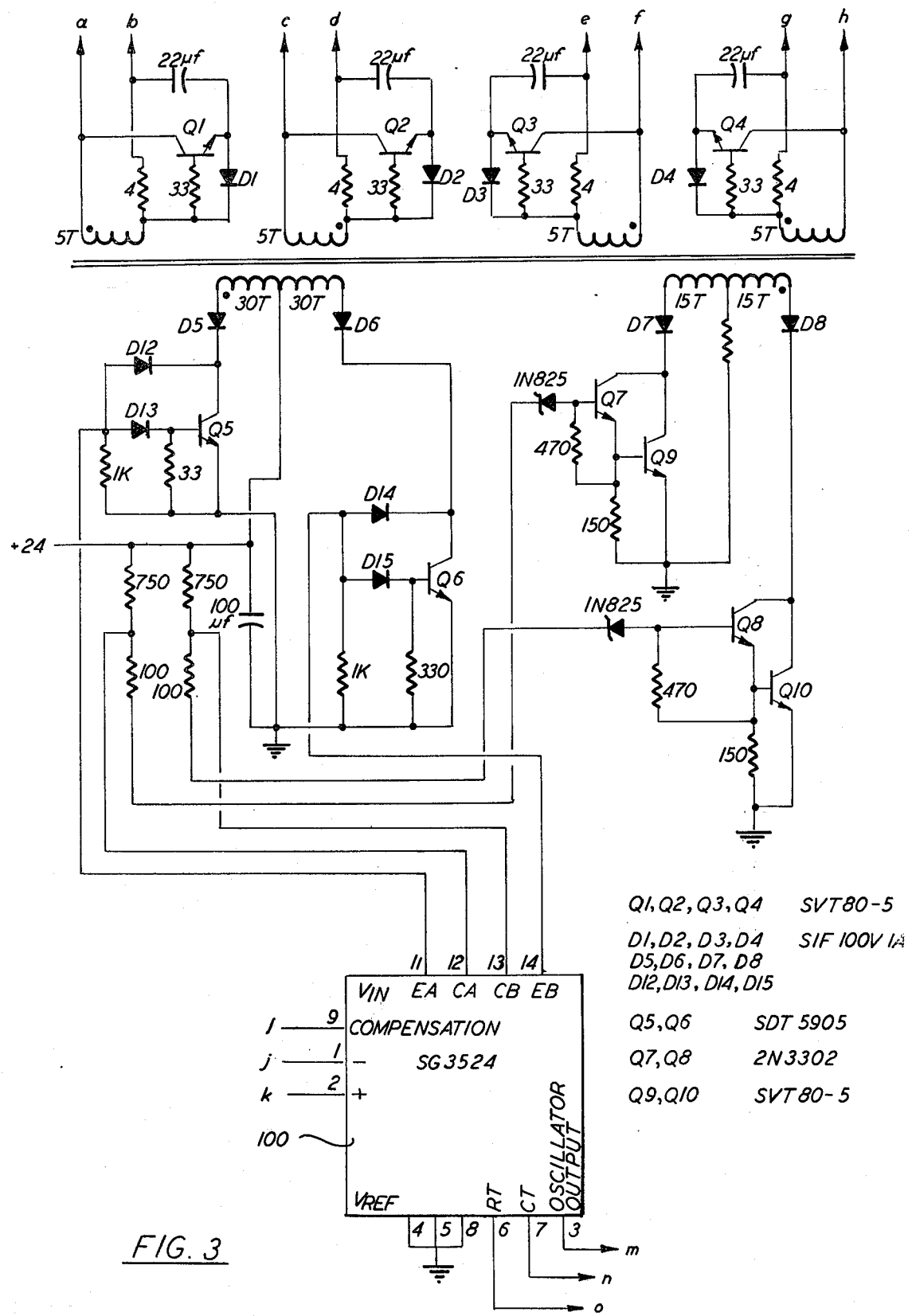
FIG. 3 shows a pulse width modulator and a driver circuit for controlling the operation of the inverter of FIG. 2.

The circuitry of FIG. 3 is illustrative of that which is required for developing the control signals for controlling the operation of the full bridge inverter of FIG. 2. Central to the operation of the circuitry of FIG. 3, however, is an integrated circuit manufactured by Silicon General known as the SG3524 and is illustrated by module 100. The module 100 has signal inputs to the lines labeled j,k and l as well as control lines labeled m,n and o. The module produces signals at its outputs labeled EA, CA, CB and EB which control the circuitry for developing the control signals on lines a,b,c,d,e,f,g and h.

It should additionally be noted that the amplifier circuit 64 of FIG. 1 is actually located in module 100 with input pin 1 being the inverting input to the amplifier and pin 2 being the non-inverting input to the amplifier. The output of the amplifier which is coupled to the compensation network 70 is pin 9 of the module 100.

FIG. 4 is a detailed circuit diagram illustrating the compensation networks 68 and 70 of FIG. 1. These compensation networks 68 and 70 are coupled into the circuitry of the system according to FIG. 1 in the manner clearly evident from the diagram of FIG. 4.

FIG. 5 illustrates a typical filter 50 of FIG. 1 which serves as a rectifier and filter to develop a DC voltage across the 1000 ohm resistor. This DC voltage is proportional to the current passing through the current sensing transformer 32. Those skilled in the art, however, will recognize that the filter 50 of FIG. 5 may be easily constructed of other elements and in various other manners.

FIG. 6 illustrates the manner in which synchronization is achieved between the pulse width modulator 28 and pulse width modulator 74. In particular, the output of each of the oscillators in the Silicon General pulse width modulator chip SG3524 are connected together as illustrated by the line with the m at either end. In addition, the lines labeled n and o of the module 100 in FIG. 3 are respectively coupled by a capacitor and a resistor to ground each element having the value illustrated in FIG. 6. This establishes a period for the oscillator in one of the Silicon General SG3524 chips. The oscillator in the other pulse width modulator chip has its lines labeled n and o coupled to a capacitor and a resistor as illustrated in FIG. 6 generally at 102, the capacitor having half the capacitance of that coupled to the other pulse width modulator and the resistor having greater resistance than that coupled to the other pulse width modulator. The value selected for the resistor and capacitor illustrated at 102 in FIG. 6 is operative to cause the period of the oscillator in the pulse width modulator in the second power module to be longer then that in the first power module. Accordingly, the signal output from the first pulse width modulator is the one which controls the operation of the pulse width modulator in the second power module.

As indicated above, the system according to the present invention as illustrated in FIG. 1 permits two identical power modules to be coupled together so as to permit current sharing between the modules when their outputs are connected together across a common load $R_L$. Because the circuitry also includes output current sensing and output voltage sensing, the combined network is operative to equally share the power delivered by the two modules to the common load.

The principles of the present invention apply equally to systems with more than two power modules. In accordance with this aspect of the invention, additional power modules identical to those illustrated in FIG. 1, are coupled together in parallel so that the load current from the additional power modules is also coupled into the common load $R_L$. The further power modules additionally include connections from the corresponding filter network therein to the line 52 and further connections to the synchronization network 72 so that the pulse width modulators of each of the power modules are operated at the same frequency. The further power modules also include an output voltage sensing line which is coupled to the common load at the same point as are the voltage sense lines of the two modules illustrated in FIG. 1. In this manner, the further power modules can respond in a proper manner to a falling output voltage across the common load.

Since the further power modules include internal current sensing circuitry, these further power modules when coupled to those in the sytem of FIG. 1, operate to share the power supplied by the modules coupled to the common load. In such a system, however, the difference signal developed is equal to the difference between the current supplied by one module and the average of the current supplied by the other modules.

It will be observed that throughout the foregoing description as well as in the drawings that certain circuit components have been assigned a parameter value or standard commercial designation. This has been done purely for clarity and reader convenience and is not intended as a limitation on component value or type nor as a restriction on the scope of the invention. It will be clear to those of skill in the art that other circuits, components, and parameters may be utilized as they are equivalent circuits without departing from the spirit and scope of the invention as defined in the following claims.

What is claimed is:

1. A current sharing power system having a plurality of modules connected together wherein each module comprises, in combination:
   a power inverter adapted to produce an alternating current output, said power inverter being responsive to an externally produced pulse width signal to vary the width of each alternating current pulse;
   current sensing circuit responsive to said alternating current pulse to produce a first current level signal to indicate the current output of the module including said current sensing circuit, said current sensing circuit including means to respond to the current level signal from each other power module coupled thereto to provide a current difference signal indicating the difference between said first current level signal and the average of all said current level signals from each other system module; and
   pulse width signal producing means responsive to said difference signal to produce said pulse width signal to cause said power inverter to produce wider pulses when said current difference signal indicates said sensed current is smaller than the average of all said sensed currents from each other system module and to produce a narrower pulse when said sensed current is greater than the average of all said sensed currents from each other system module.

2. The current sharing power system of claim 1 wherein each module additionally includes:
   means to sense the voltage output of each said power inverter;
   said pulse width signal producing means being additionally responsive to the voltage sensed by said voltage output sensing means to modify said pulse width signal to increase the width of pulses produced by said power inverter when said sensed voltage is below a desired voltage and to decrease the width of pulses produced by said power inverter when said sensed voltage is above the desired voltage.

3. The current sharing power system of claim 1 wherein the system additionally includes a rectifier and filter network coupled to the output of each power inverter to produce DC current at the output of each rectifier and filter network.

4. The current sharing power system of claim 1 wherein the system additionally includes means to synchronize each of said power inverters to produce said alternating current pulses at the same frequency.

5. The current sharing power system of claim 1 wherein each said current sensing circuit includes a transformer having said alternating current pulses from the module passing through its primary winding, each said transformer having a secondary winding in which a voltage is induced which is proportional to the current in its primary winding.

6. A current sharing power system for sharing current load between two modules comprising, in combination:
   a source of direct current electrical power;
   a first and a second power inverter, each adapted to convert said direct current electrical power into respectively a first and a second alternating current output, said first and said second power inverter being respectively responsive to an externally produced first pulse width signal and a second pulse width signal to vary the width of the alternating current pulse produced at each inverter output;
   a first current sensing circuit to produce a first current level signal to indicate the current output of said first power inverter and a second current sensing circuit to produce a second current level signal to indicate the current output of said second power inverter, said first current sensing circuit including a first difference circuit to produce a first current difference signal in response to said first current level signal and said second current level signal, said first current difference signal indicating the difference between said first current level signal and said second current level signal, said second current sensing circuit including a second difference circuit to produce a second difference signal in response to said first current level signal and said second current level signal to indicate the difference between said second current level signal and said first current level signal,
   first pulse width signal generator means responsive to said first difference signal to produce said first pulse width signal to cause said first power inverter to produce a wider pulse when said first current difference signal indicates said first current level signal is smaller than said second current level signal and to produce a narrower pulse when said second current level signal is smaller than said first current level signal; and
   second pulse width signal generating means responsive to said second difference signal to produce said second pulse width signal to cause said second power inverter to produce a wider pulse when said second current difference signal indicates said second current level signal is smaller than said first current level signal and to produce a narrower pulse when said first current level signal is smaller than said second current level signal.

7. The current sharing power system of claim 6 additionally including:
   a first voltage sensing circuit for producing a first sensed voltage signal indicating the voltage across the common load;

a second voltage sensing circuit for producing a second sensed voltage signal also indicating the voltage across the common load;

said first pulse width generator responding to said first sensed voltage signal to alter said first pulse width signal to cause said first power inverter to widen the alternating current pulses produced thereby when said first sensed voltage is below a selected value and to narrow the alternating current pulses produced thereby when said first sensed voltage is above said selected value;

said second pulse width generator responding to said second sensed voltage signal to alter said second pulse width signal to cause said second power inverter to widen the alternating current pulses produced thereby when said second sensed voltage is below said selected value and to narrow the alternating current pulses produced thereby when said second sensed voltage is above said selected value.

8. The current sharing power system of claim 6 additionally including a first rectifier and filter network coupled to the output of said first power inverter to produce a DC current at the output of said first rectifier and filter network;

a second rectifier and filter network coupled to the output of said second power inverter to produce a DC current at the output of said second rectifier and filter network, the output of said second filter and rectifier network being coupled to the output of said first rectifier and filter network as well as to a common load.

9. The current sharing power system of claim 6 additionally including means to synchronize said first power inverter and said second power inverter so that the alternating current pulses produced at each inverter output are at the same frequency.

10. A current sharing power system for sharing the current load between two sub-systems comprising, in combination:

a first and a second power inverter, each said power inverter being adapted to produce respectively a first and a second alternating current output, said first and said second power inverter being respectively responsive to an externally produced first pulse width signal and a second pulse width signal, each pulse width signal being operative to vary the width of the alternating current pulse produced at each said power inverter output;

a first and a second rectifying and filtering circuit respectively coupled to the output of said first and said second power inverter to respectively produce a first and a second substantially ripple-free output current, said first and said second ripple-free output current being coupled together to form a common power source for a power distribution network which is coupled thereto;

a first current sensing means to sense the current at the output of said first power inverter and produce a first sensed current signal;

second current sensing means to sense the current at the output of said second power inverter and to produce a second sensed current signal;

first difference circuit means to produce a first difference signal proportional to the difference between said first sensed current signal and said second sensed current signal;

second difference circuit means to produce a second difference signal proportional to the difference between said second sensed current signal and said first sensed current signal;

a first and a second voltage sensing circuit each operable respectively to produce a first and a second sensed voltage signal indicating the voltage appearing on the power distribution network coupled to the output of said first and said second rectifying and filtering circuit;

a first pulse width control signal generating means responsive to said first sensed voltage signal and to said first difference signal to produce a first pulse width signal which increases the power output from said first power inverter when said first power inverter is supplying less power than said second power inverter and decreases the output power when said first power inverter is supplying more power than second power inverter;

second pulse width control signal generating means responsive to said second sensed voltage signal and to said second difference signal to produce a second pulse width signal which increases the output power from said second power inverter circuit when said second power inverter is supplying less power than said first power inverter and decreases the output power when said second power inverter is supplying more power than said first power inverter.

* * * * *